No. 639,807. Patented Dec. 26, 1899.
M. FOIDART.
BALL BEARING.
(Application filed July 7, 1897.)
(No Model.)
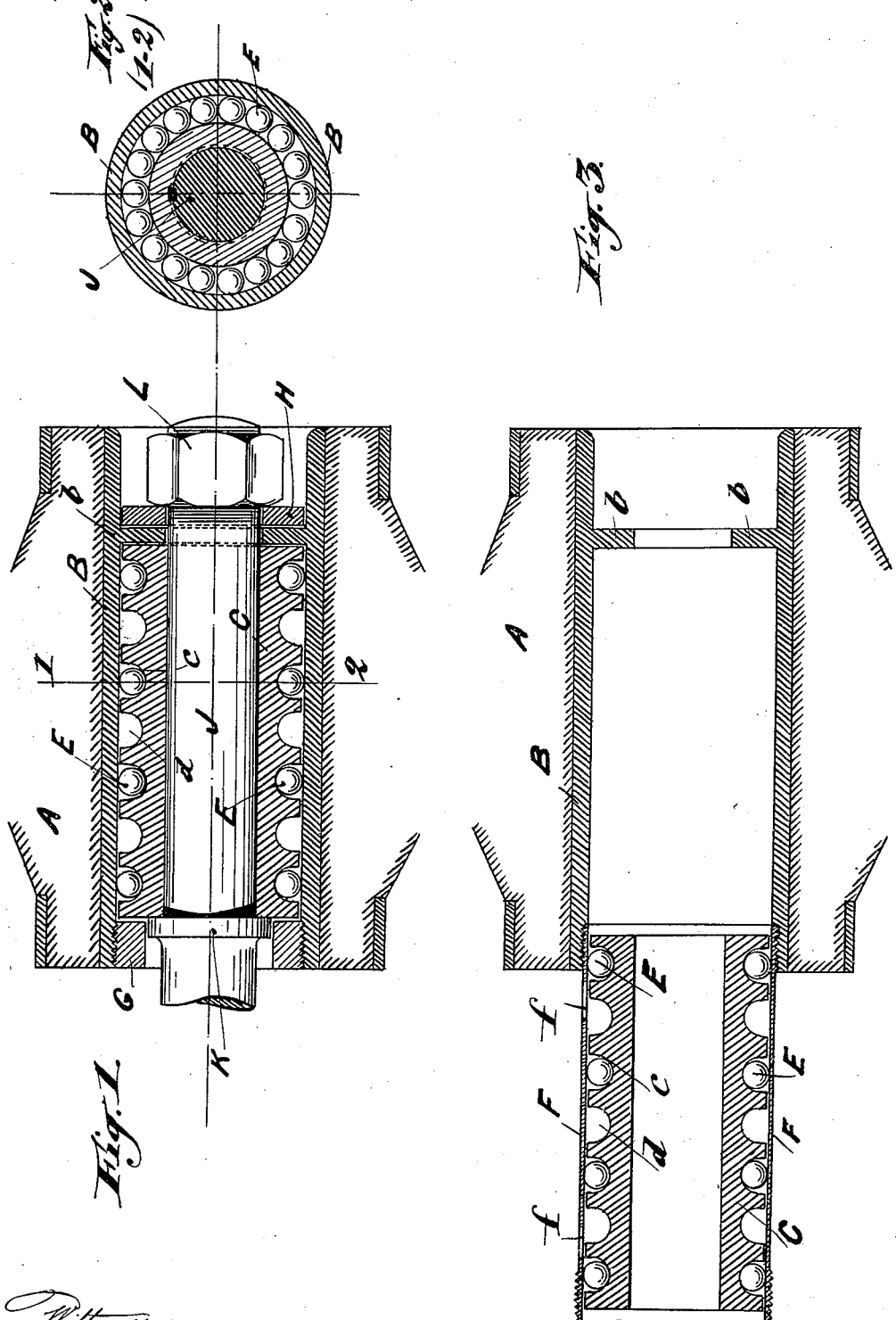

UNITED STATES PATENT OFFICE.

MATHIEU FOIDART, OF BRUSSELS, BELGIUM.

BALL-BEARING.

SPECIFICATION forming part of Letters Patent No. 639,807, dated December 26, 1899.

Application filed July 7, 1897. Serial No. 643,770. (No model.)

*To all whom it may concern:*

Be it known that I, MATHIEU FOIDART, a citizen of Belgium, residing at Brussels, Belgium, have invented certain new and useful Improvements in Ball-Bearings, of which the following is a specification, the same having been patented by Letters Patent in Belgium, No. 116,276, dated June 26, 1895; No. 117,729, dated October 4, 1895, and No. 123,601, dated September 21, 1896; in Switzerland, No. 11,265, dated September 24, 1895, and applied for September 20, 1898; in Germany, No. 86,410, dated October 12, 1895, and in Great Britain, No. 23,936, dated October 27, 1896.

The object of my invention is an improved ball-bearing specially intended for heavy loads and allowing the unfitting and verifying of the bearing without difficulty and loss of time.

In the accompanying drawings is shown a working form of my ball-bearing as applied to a wheel-hub.

Figure 1 is a longitudinal section of the right-hand wheel-hub of a carriage provided with the ball-bearing and mounted on its axle. Fig. 2 is a transverse section of the same hub also mounted. Fig. 3 shows the way of mounting and fitting the ball-bearing into the hub.

On the journal J of the axle is keyed the sleeve C, provided externally with grooves $c$ and $d$, arranged alternately, and in the grooves $c$ are disposed the balls E, on which revolves the casing B, made of tempered steel and of one single piece, while the grooves $d$ serve as oil-reservoirs for lubricating the balls lodged in the adjoining grooves $c$. The grooves $d$ may, however, serve also for containing balls, which allows the resistance of the bearing to be increased. It is even preferable to fill these grooves $d$ with balls for very heavy loads, so as not to exaggerate the size of the bearing. The above casing B is provided near to its outer end with a shoulder $b$, against which rests the ring G. The other end of casing B is threaded internally. A threaded ring G binds the grooved sleeve C to the interior of the hub A by its being screwed on the above internal-threaded end of the casing B. The fitting is made very easily by means of a removable tubular projection F of the casing B. That projection F carries at its ends two threads, each right or left, in order to allow its being used on right or left hand wheels. Moreover, near those threaded parts are drilled two holes $f f'$, through which the balls are introduced.

The introduction of the balls into the grooves of the sleeve C and of the sleeve C itself into the casing B is made in the following way: One of the threaded ends of the projection F is screwed on the internal end of the casing B, and the sleeve C is slid into the interior of the projection F, care being taken to make the balls E go into the grooves $c$ through the hole $f$ as soon as the said grooves pass in front of the hole. When the grooves $c$ are filled with balls, the grooved sleeve C is pushed into the casing B until it strikes the shoulder $b$. The projection F is then unscrewed, and a ring G, maintaining the whole system, takes its place. Setting the wheel is finally executed by sliding it on the axle-journal J, keying the sleeve C and fastening as usual at the extremity of the journal by means of a nut L and a washer H.

The specification and drawings refer to a motion for a fixed axle; but the use of my ball-bearing is not, evidently, limited to that case alone and can be applied equally well to movable shafts—in the bearings, for instance—and generally to all organs of machinery in which rotates a movable axle or that revolve around a fixed axle.

Having fully described my invention, what I claim, and desire to secure by Letters Patent, is—

1. An implement to be employed in assembling a ball-bearing, comprising a tube having at an end means for connecting it with the outer end of the casing of the bearing and two ball-holes in the tube adjacent to the ends thereof and so spaced apart as to be in alinement with the ball-grooves in the sleeve of the bearing to be assembled, substantially as set forth.

2. The combination with casing B and balls

E of bearing-sleeve C, having annular grooves $c$ for holding said balls and alternating annular grooves $d$ for holding oil and intervening annular partitions extending outward between said grooves to said casing, the balls also fitting in the bottoms of the grooves $c$ and being of diameter sufficient for contact with said casing, substantially as set forth.

MATHIEU FOIDART.

Witnesses:
GUSTAV KIRD,
AD. STURM.